United States Patent [19]

Sugiyama

[11] Patent Number: 4,700,238
[45] Date of Patent: Oct. 13, 1987

[54] COPYING APPARATUS

[75] Inventor: Hiroshi Sugiyama, Tokyo, Japan

[73] Assignee: Canon Kabushiki Kaisha, Tokyo, Japan

[21] Appl. No.: 796,311

[22] Filed: Nov. 8, 1985

[30] Foreign Application Priority Data

Nov. 19, 1984 [JP] Japan ............................. 59-243908
Nov. 19, 1984 [JP] Japan ............................. 59-243909
May 15, 1985 [JP] Japan ............................. 60-103079

[51] Int. Cl.[4] ..................... H04N 1/10; H04N 1/04; G06F 15/40
[52] U.S. Cl. ................................. 358/300; 358/296; 358/283; 364/520; 364/519
[58] Field of Search ................... 304/518, 519, 520; 358/296, 300, 285, 283; 346/108; 355/8

[56] References Cited

U.S. PATENT DOCUMENTS 4,196,455 4/1980 Brooke .......................... 358/285 X

FOREIGN PATENT DOCUMENTS 60-141072 7/1985 Japan ............................. 358/285

Primary Examiner—E. A. Goldberg
Assistant Examiner—Linda M. Peco
Attorney, Agent, or Firm—Fitzpatrick, Cella, Harper & Scinto

[57] ABSTRACT

A copying apparatus wherein an original supported on an original support is read by a reading head, which produces electric signals corresponding to the image. A recording head forms an image of the original on recording paper in accordance with the electric signals. The reading head and the recording head are in substantially the same place, whereby the size of the apparatus can be reduced.

24 Claims, 6 Drawing Figures

COPYING APPARATUS

FIELD OF THE INVENTION AND RELATED ART

The present invention relates to a copying apparatus or a variable magnification copying apparatus wherein a reading head scans and reads an image of the original and produces electric signals corresponding to the image, by which signals a recording head is controlled so that it scans and form a copy image on a recording medium.

FIG. 4 is a perspective view of a conventional copying apparatus of this type. As shown in this Figure, an original supporting glass 1 supports an original. A reading head 3 for reading an image of the original 2 is provided below the original supporting glass 1, and its light receiving side faces up. The reading head 3 is supported and guided on main-scan guide rails 5a and 5b.

A main-scan wire 6 is operably arranged around a pulley 7a and a pulley 7b and is fixed to the reading head 3. The pulley 7a is operably connected with an output shaft of a main-scan motor 8. Sub-scan carriages or supports 10a and 10b are connected to the main-scan guide rails 5a and 5b. The sub-scan supports are slidably supported on guide rails 11a and 11b, respectively. A sub-scan wire 13 is operably arranged around pulleys 15a and 15b and is connected to the sub-scan support 10b. The pulley 15a is operably connected to an output shaft of a sub-scan motor 17.

A recording paper 102 is placed on a recording paper support 101, and a recording head 103 disposed above the support 101 forms a copy image on the recording paper. The recording head 103 is supported and guided on main-scan guide rails 105a and 105b. A main-scan wire 106 is operably arranged around a pulley 107a and a pulley 107b and is fixed to the reading head 103. The pulley 107a is operably connected with an output shaft of a main-scan motor 108. Sub-scan supports 110a and 110b are connected to the main-scan guide rails 105a and 105b. The sub-scan supports are slidably supported on guide rails 111a and 111b, respectively. A sub-scan wire 113 is operably arranged around pulleys 115a and 115b and connected to the sub-scan support 110b. The pulley 115a is operably connected to an output shaft of a sub-scan motor 117.

In operation, the reading head 3 is guided on the main-scan guide rails 5a and 5b and driven by the main-scan motor 8 through the main-scan wire 6 to move in the main-scan direction so as to read the original 2. Then, the reading head 3 produces electric signals corresponding to the read image of the original. The electric signals are processed by an unshown electric circuit and transmitted to the recording head 103.

The recording head 103 is guided by the main-scan guide rail 105a and 105b and driven by the main-scan motor 108 through the main-scan wire 106 to move in the main-scan direction. During this movement, the recording head 103 effects recording on the recording paper 102 in accordance with the electric signals transmitted from the reading head 3 so as to form an image of the original on the recording paper 102.

Then, the reading head 3 and the recording head 103 shift in the sub-scan direction which is substantially perpendicular to the main-scan direction, to the position where the next main-scan is to be effected. During the movement, the reading head 3 is guided on the sub-scan guide rails 11a and 11b together with the sub-scan supports 10a and 10b to which the main-scan guide rails 5a and 5b are connected, and is driven by the sub-scan motor 17 through the sub-scan wire 13 to the above position and stops there. On the other hand, the recording head 103 is guided on the sub-scan guide rails 111a and 111b together with the sub-scan supports 110a and 110b to which the main-scan guide rails 105a and 105b are connected, and is driven by the sub-scan motor 117 through the sub-scan wire 113 to the above position and is stopped there.

The amounts of movements of the reading head 3 and the recording head 103 in one sub-scan shift are determined in accordance with a magnification at which the copying is performed.

The above-described main-scan and the sub-scan operations are repeated so that one-to-one, enlarged or reduced image is formed. In this conventional structure of this apparatus, many (four) sub-scan guide rails 11a, 11b, 111a and 111b are required, so that it is costly. Also, the reading station is above the recording station, it is difficult to reduce the height of the apparatus without reducing the size of each of the parts, and therefore, it is very difficult to reduce the size of the apparatus.

SUMMARY OF THE INVENTION

Accordingly, it is a principal object of the present invention to provide a copying apparatus wherein the height of the apparatus can be reduced without damaging the copying function.

It is another object of the present invention to provide a copying apparatus having the above advantage wherein an enlarging copy is possible in addition to one-to-one copy.

It is a further object of the present invention to provide a copying apparatus having the above described advantage, wherein a reducing copy is possible in addition to one-to-one copy.

It is a further object of the present invention to provide a copying apparatus having the above described advantage, wherein enlarging and reducing copies are possible in addition to one-to-one copy.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
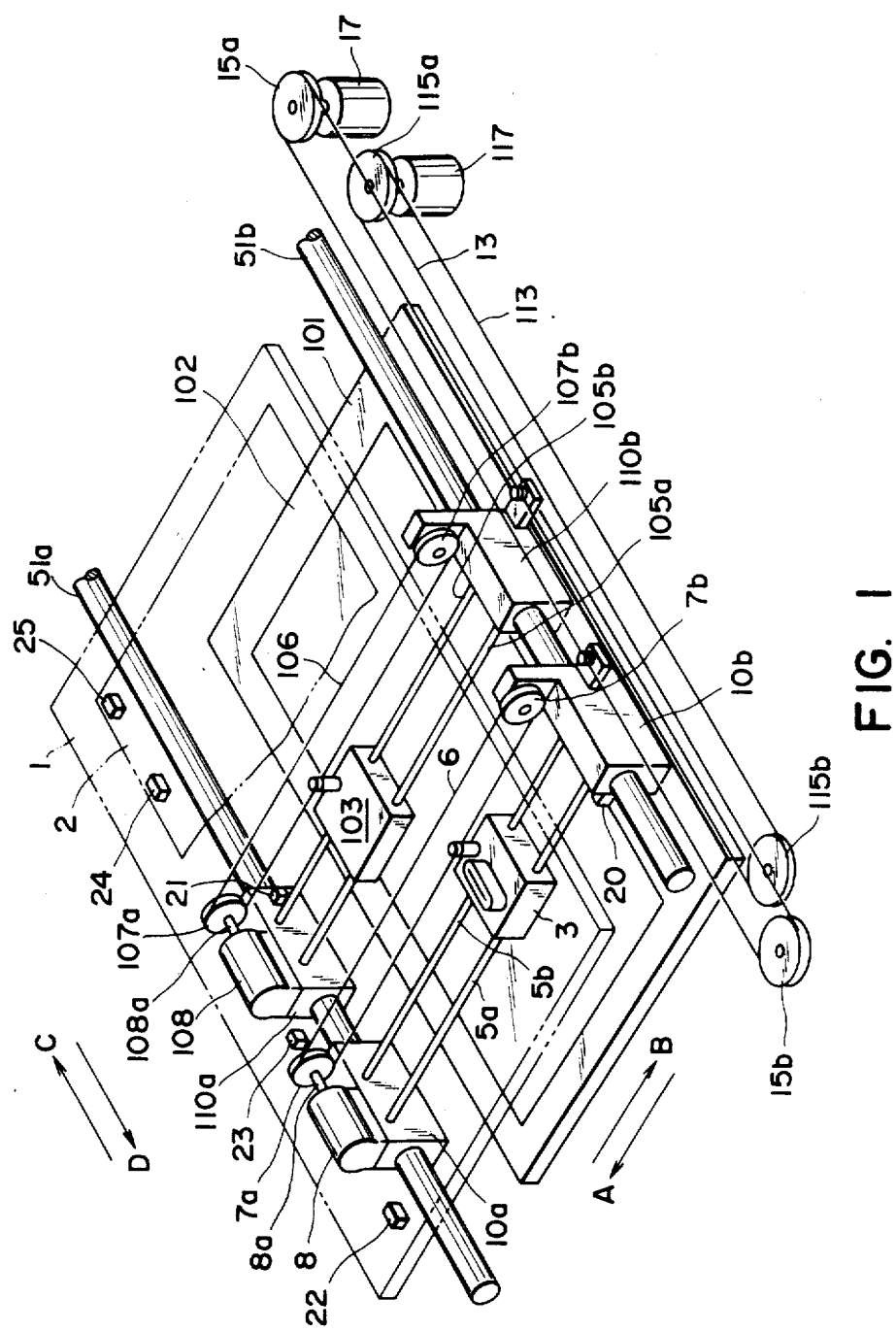
FIG. 1 is a perspective view of a copying apparatus according to an embodiment of the present invention.

Referring now to FIG. 1, there is shown a copying apparatus according to an embodiment of the present invention.

As shown, the apparatus comprises a flat original supporting glass 1, on which an original 2 is placed face down. The apparatus further comprises a reading head 3 for reading an image of the original 2, and the reading head 3 is slidably supported and guided by guiding means including main-scan guide rails 5a and 5b with its light receiving side facing up. The reading head 3 is provided with an image sensor such as a CCD (Charge Coupled Device) for transducing the received light image to electric signals and an imaging lens for forming an image of the original on the image sensor. The image sensor has a number of fine photoelectric converting elements arranged on a line or lines, along which the reading head electrically scans. The direction of the electric scan is substantially perpendicular to the direction of movement of the recording head 3 guided by the main-scan guide rails 5a and 5b.

A main-scan wire 6 is operatively disposed or trained around pulleys 7a and 7b and is fixed to the recording head 3. The pullely 7a is operably connected to a rotational shaft 8a connected to a main-scan motor 8 supported on a sub-scan support 10a. The driving source constituted by the main-scan motor 8 and the rotational shaft 8a in this embodiment is so positioned that its longitudinal direction is substantially horizontal, whereby the height of the apparatus can be reduced and whereby the center of gravity can be lowered, and the vibration can be reduced. The pulley 7b is supported on a sub-scan support 10b. The sub-scan supports 10a and 10b are connected to the main-scan guide rails 5a and 5b and are slidably supported and guided on sub-scan guide rails 51a and 51b, respectively. A sub-scan wire 13 is trained around pulleys 15a and 15b which are rotatable at the respective fixed positions. The sub-scan wire 13 is fixed to the sub-scan support 10b. The pulley 15a is connected to and driven by a sub-scan motor 17 disposed at a fixed position.

A recording paper support 101 is planar and parallel to the original supporting glass 1, and it supports recording paper 102. A recording head 103 is effective to form a copy image on the recording paper 102. The recording head is slidably supported and guided by guiding means including the main-scan guide rails 105a and 105b. In this embodiment, the recording head 103 is provided with a number of fine ink jet elements arranged in a line or lines in a direction substantially perpendicular to the direction of movement of the recording head 103 guided by the main-scan guide rails 105a and 105b. The array or arrays of the ink jet elements are electrically actuated scanningly in the direction of the array.

The main-scan wire 106 is trained around pulleys 107a and 107b and is fixed to the recording head 103. The pulley 107a is operably connected to a drive transmission 108a operably connected to a main-scan motor 108 supported on a sub-scan support 110a. The driving means constituted by the main-scan motor 108 and the drive transmission 108a is so arranged that its longitudinal axis is substantially horizontal whereby the height of the apparatus is reduced, and it is hardly influenced by the vibration. The pulley 107b is supported on a sub-scan support 110b. The sub-scan supports 110a and 110b are connected to the main-scan guide rails 105a and 105b and is slidably supported and guided by the sub-scan guide rails 51a and 51b, respectively. It should be noted that in this embodiment the sub-scan supports 110a and 110b are supported on the guide rails which are commonly used for supporting the sub-scan supports 10a and 10b of the image reading station. A sub-scan wire 113 is trained around pulleys 115a and 115b which are rotatably supported at the respective fixed positions. The sub-scan wire 113 is fixed to the sub-scan support 110b. The pulley 115a is operatively coupled to and driven by a sub-scan motor 117 disposed at a fixed position.

In this embodiment, the reading head 3 and the recording head 103 are disposed in a substantially common plane, that is, a part of the reading head 3 and a part of the recording head 103 are in the same plane. This substantially co-planar arrangement makes it possible to reduce the size, particularly the height, of the apparatus. Further, in this embodiment, the reading head 3 and the recording head 103 are guided by the common guiding means so that the number of parts of the apparatus is reduced, which is effective to reduce the cost of the apparatus.

In operation, the reading head 3 is driven by the main-scan motor 8 through the main-scan wire 6 and it slides on the guide rails 5a and 5b from its home position (main-scan start position) in the main-scan direction indicated by an arrow A, with the sub-scan motor 17 not operated. During this sliding movement, the reading head 3 scans and reads the original 2 supported face down on the supporting glass 1. The reading head 3 produces electric signals corresponding to the image which it reads. The electric signals are processed by a known electric circuit (not shown) and are transmitted to the recording head 103.

The recording head 103 is driven by the main-scan motor 108 through the main-scan wire 106, and it slides on the main-scan guide rails 105a and 105b from its home position (main-scan start position) in the main-scan direction indicated by an arrow B, with the sub-scan motor 117 not operated. The recording head 103 receiving the electric signals forms a copy image on the top surface of the recording paper 102 in accordance with the electric signals. Since that surface of the original 2 which is being read and that surface of the recording sheet 102 which is being subjected to the recording or image forming operation are opposed to each other, the direction A and the direction B are opposite so as to form the same image, that is, not a reversed image. The reading head 3 and the recording head 103 may be moved in the respective scanning directions continuously or finely stepwisely.

If the magnification m of the copy image is not unit magnification, the speed of the recording head movement is m multiplied by the speed of the reading head 3 in the case where those heads are moved continuously, where m is the magnification. Here, the magnification is a one dimensional magnification, that is, not on the basis of the area change. In the case of the stepwise scan, the distance of one step movement of the recording head 103 is m multiplied by the one step movement of the reading head 3. The motors 8 and 108 are controlled and energized in accordance with the selected magnification in this manner.

Figure 2:
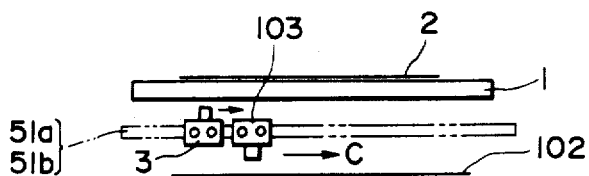
FIG. 2 is a sectional view of a part of a copying apparatus wherein an enlarging copying operation is performed.
Figure 3:
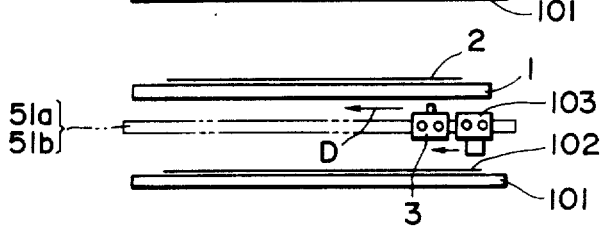
FIG. 3 is a sectional view of a part of a copying apparatus wherein a reducing copying operation is performed.
Figure 4:
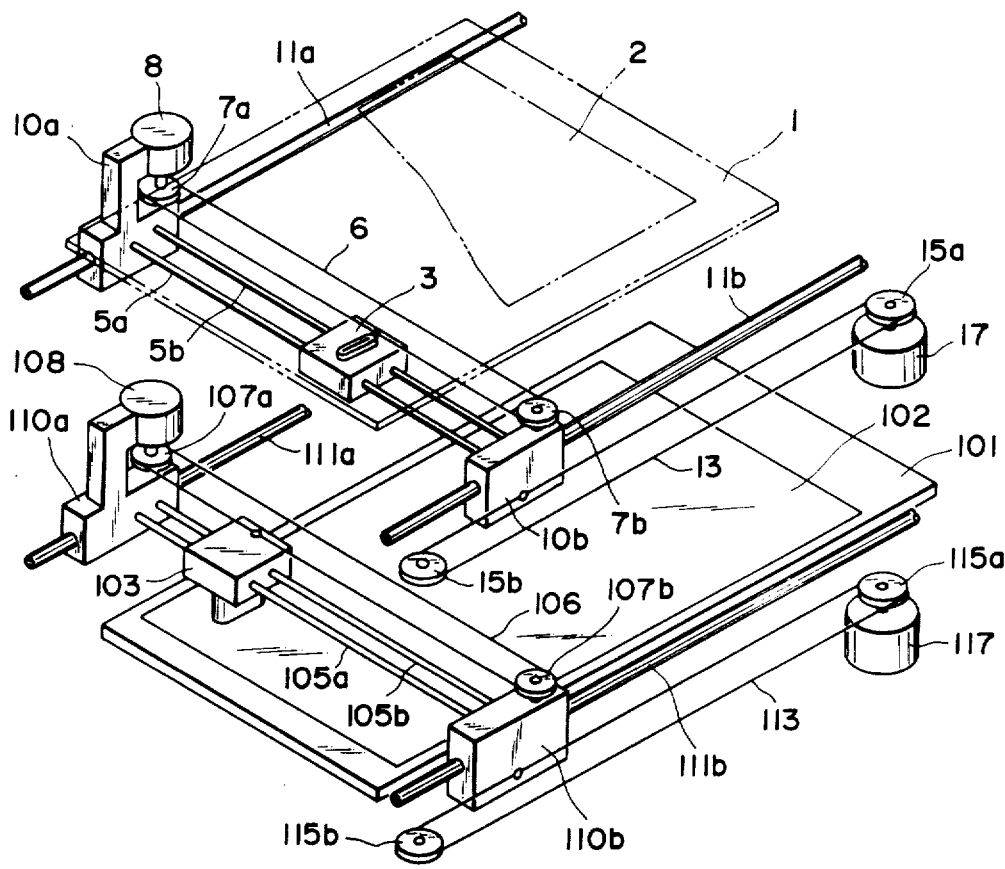
FIG. 4 is a perspective view of a conventional copying apparatus.

Upon completion of one main-scan as described above, the reading head 3 and the recording head 103 are shifted in the sub-scan direction which is substantially perpendicular to the main-scan direction to a position where the next main-scan operation is to be performed. The reading head 3, together with the main-scan guide rails 5a and 5b and the sub-scan supports 10a and 10b connected thereto, is driven by the sub-scan motor 17 through the sub-scan wire 13, with the sub-scan supports 10a and 10b sliding on the common sub-scan guide rails 51a and 51b, respectively. When they move a predetermined amount, they stop. The recording head 103, together with the main-scan guide rails 105a and 105b and the sub-scan supports 110a and 110b connected thereto, is driven by the sub-scan motor 117 through the sub-scan wire 113, with the sub-scan supports 110a and 110b sliding on the common sub-scan guide rails 51a and 51b, respectively. When they move a predetermined amount, they stop. Thus, the sub-scan supports 10a and 10b, 110a and 110b are shifted to the next main-scan position in the sub-scan direction. The reading head 3 and the recording head 103 are restored to their respective home positions after the previous main-scan completes and before the next main-scan starts, for example, during or prior to the sub-scan movement. The distances through which the reading head 3 and the recording head 103 move in one sub-scan movement, are determined in accordance with the magnification m. More particularly, the distance of movement of the recording head 103 is m multiplied by the distance of the movement of the reading head 3. The motors 17 and 117 are so controlled to satisfy this. When the magnification is 3, for example, the distance of sub-scan movement of the reading head 3 is one third of that of the recording head 103. Thus, the moving distance of the recording head 103 is larger than that of the reading head 3 upon the enlarging magnification. By moving the heads 3 and 103 in the direction indicated by an arrow C as shown in FIGS. 1 and 2 in the sub-scan movement, those heads 3 and 103 do not interfere with each other, and therefore, they do not contact or collapse, although they are arranged co-planar. Therefore, upon the enlarging magnification, the reading head 3 and the recording head 103 are arranged so that the reading head 3 follows the recording head 103. The enlarging copying operation starts after such a positioning relation is accomplished. Upon the reducing magnification on the contrary, the moving distance of the reading head 3 in the sub-scan direction is larger than that of the recording head 103. Therefore, the sub-scan direction is as shown by an arrow D in FIGS. 1 and 3, so that the reading head 3 and the recording head 103 do not interfere. In this case, the copying operation starts after such a positional relation is achieved that the recording head 103 follows the reading head 3.

In other words, the head which moves a larger distance takes a leading position relative to the other head in the sub-scan movement. To achieve this, the home position of the sub-scan movement is switched.

In the manner described above, the cost and size of the apparatus can be reduced without an interference between the heads and without losing the enlarging and/or reducing magnification function.

Next, the operation in the enlarging magnification copy and the reducing magnification copy will be described in further detail. Although the sub-scan supports 10a and 10b for the reading head 3 and the sub-scan supports 110a and 110b for the recording head 103 move co-directionally irrespective of the magnification, the direction is different depending on the magnification. More particularly, the direction upon the enlarging magnification (and the unit magnification) and that upon the reducing magnification are opposite. Therefore, the home positions are switched depending on the magnification.

The copying apparatus comprises position sensors 22, 23, 24 and 25 such as a microswitch or photointerruptor fixed at respective predetermined positions in the apparatus. The sensor 22 is actuated by the sub-scan support 10a when the sub-scan support 10a is at a home position (HP1) for the enlarging magnification (and the unit magnification). The sensor 23 is actuated by the sub-scan support 110a when the sub-scan support 110a is at a home position (HP2) for the enlarging magnification (and the unit magnification). The sensor 24 is actuated by the sub-scan support 10a when it is at a home position (HP3) for a reducing magnification. The sensor 25 is actuated by the sub-scan support 110a when it is at a home position (HP4) for a reducing magnification. Those home positions HP1, HP2, HP3 and HP4 are disposed in this order in the direction of the arrow C.

Another position sensor 20 is fixed on the sub-scan support 10a, and a position sensor 21 is fixed to the sub-scan support 110a. They may be a microswitch, a photointerruptor or the like. The sensor 20 is actuated by a reading head 3 when it is at a home position (HP5) on the guide rails 5a and 5b. On the other hand, the sensor 21 is actuated by the recording head 103 when it is at a home position (HP6) on the guide rails 105a and 105b.

Figure 5:
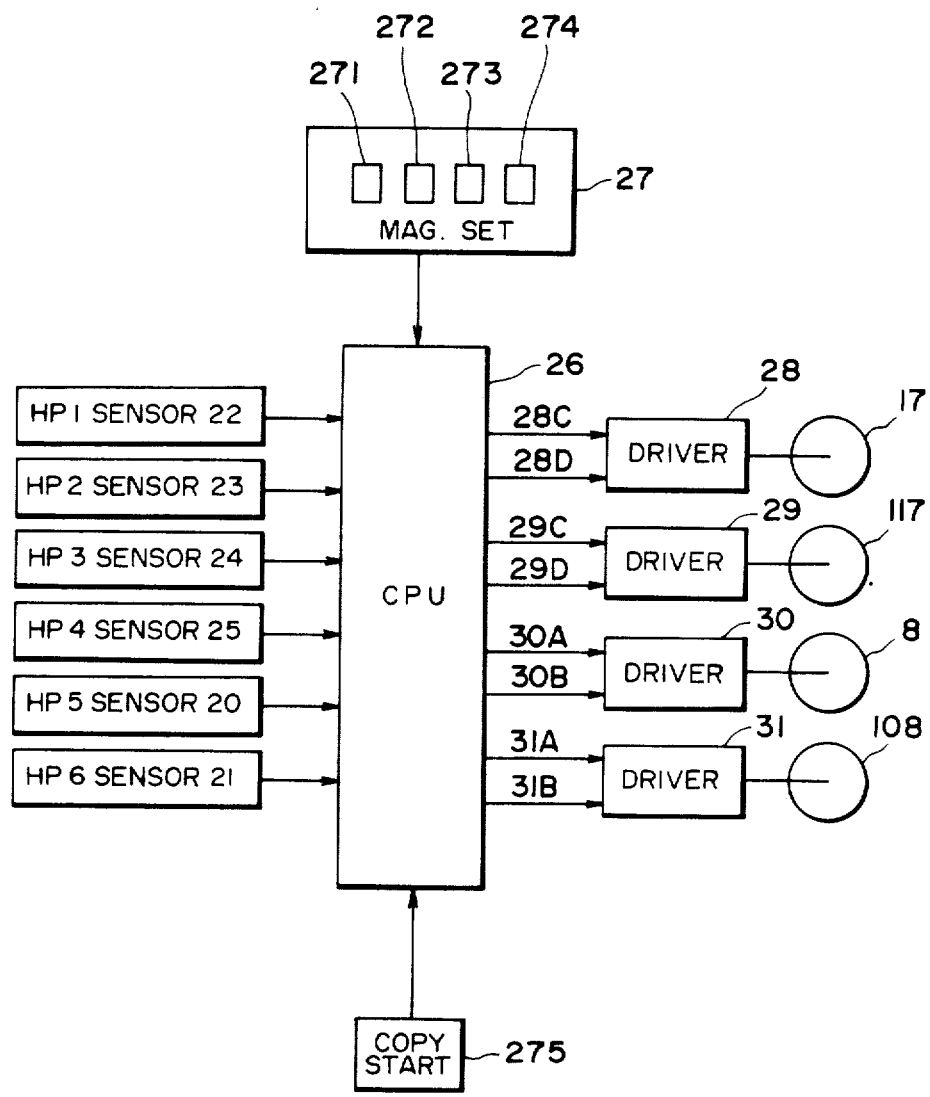
FIG. 5 is a block diagram of a control system.

As shown in FIG. 5, the signals produced by those sensors 20-25 upon actuation are transmitted to a central processing unit (CPU) 26 including a microcomputer. To the central processing unit 26, other signals are transmitted, such as the signals from an enlarging copy selecting key 271, one-to-one (unit magnification) copy selecting key 272, first and second reducing magnification copy selecting keys 273 and 274 and a copy start instruction key 275 which are disposed on an operating panel. The unit 26 produces driving signals to motor drivers 28, 29, 30 and 31 in accordance with the above-described input signals. The drivers 28, 29, 30 and 31 are effective to energize the motors 17, 117, 8, and 108, respectively. Those motors are reversible, and signals 28C and 29C forwardly rotate the motors 17 and 117, respectively, by which the sub-scan support operatively coupled thereto, and therefore, the heads 3 and 103 move in the direction indicated by the arrow C. Signals 28D and 29D rotate the motors 17 and 117 backwardly, whereby the associated sub-scan supports, and therefore, the heads 3 and 103 move in the direction of the arrow D. By signals 30a and 31a, the motors 8 and 108 rotate forwardly, whereby the heads 3 and 103 move in the direction of the arrow A, while signals 30B and 31B are effective to reverse the motors 8 and 108 to move the heads 3 and 103 in the direction of the arrow B.

Figure 6:
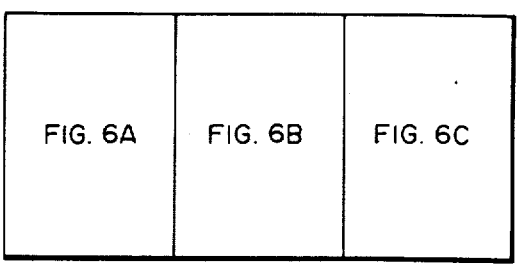
FIG. 6 is a flow chart illustrating the control operation.
Figure 6C:
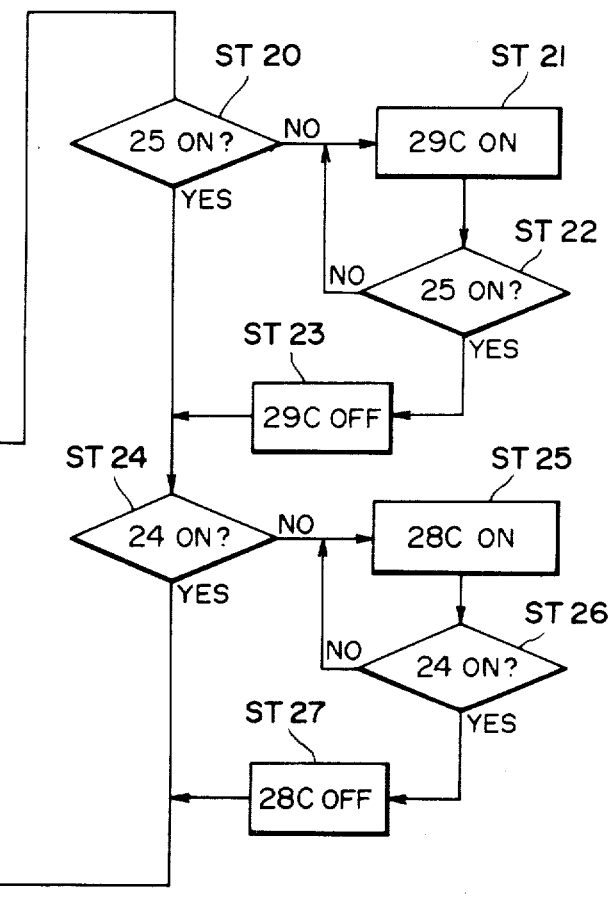
Figure 6A:
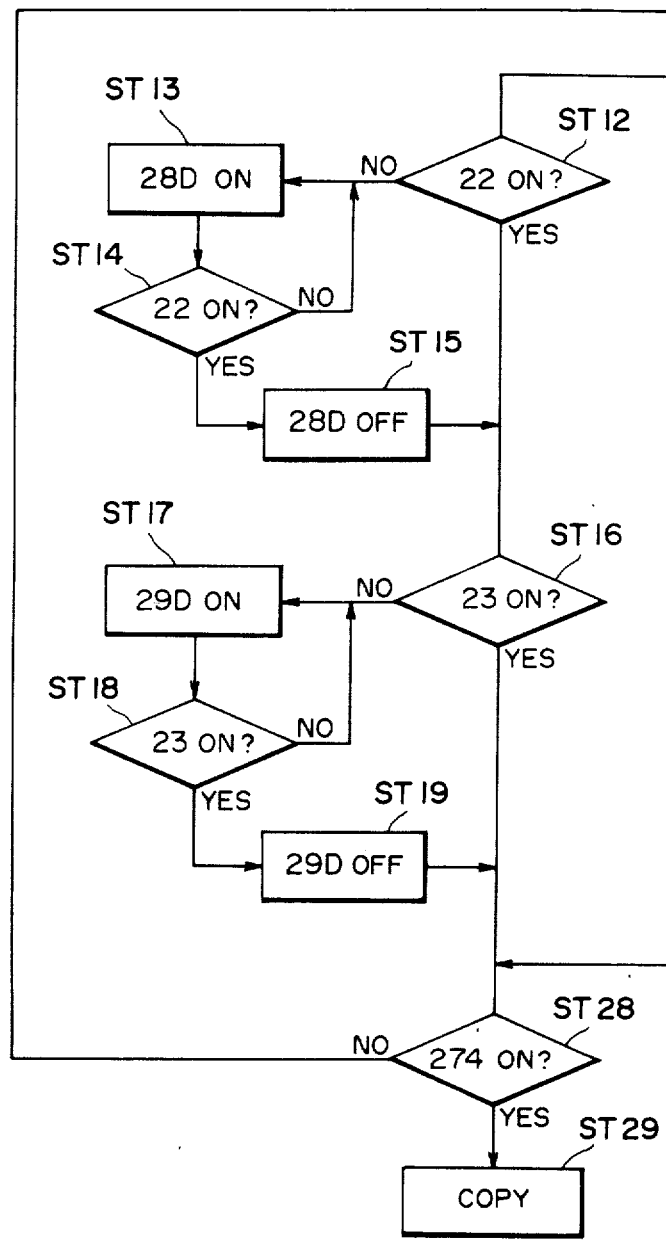
Figure 6B:
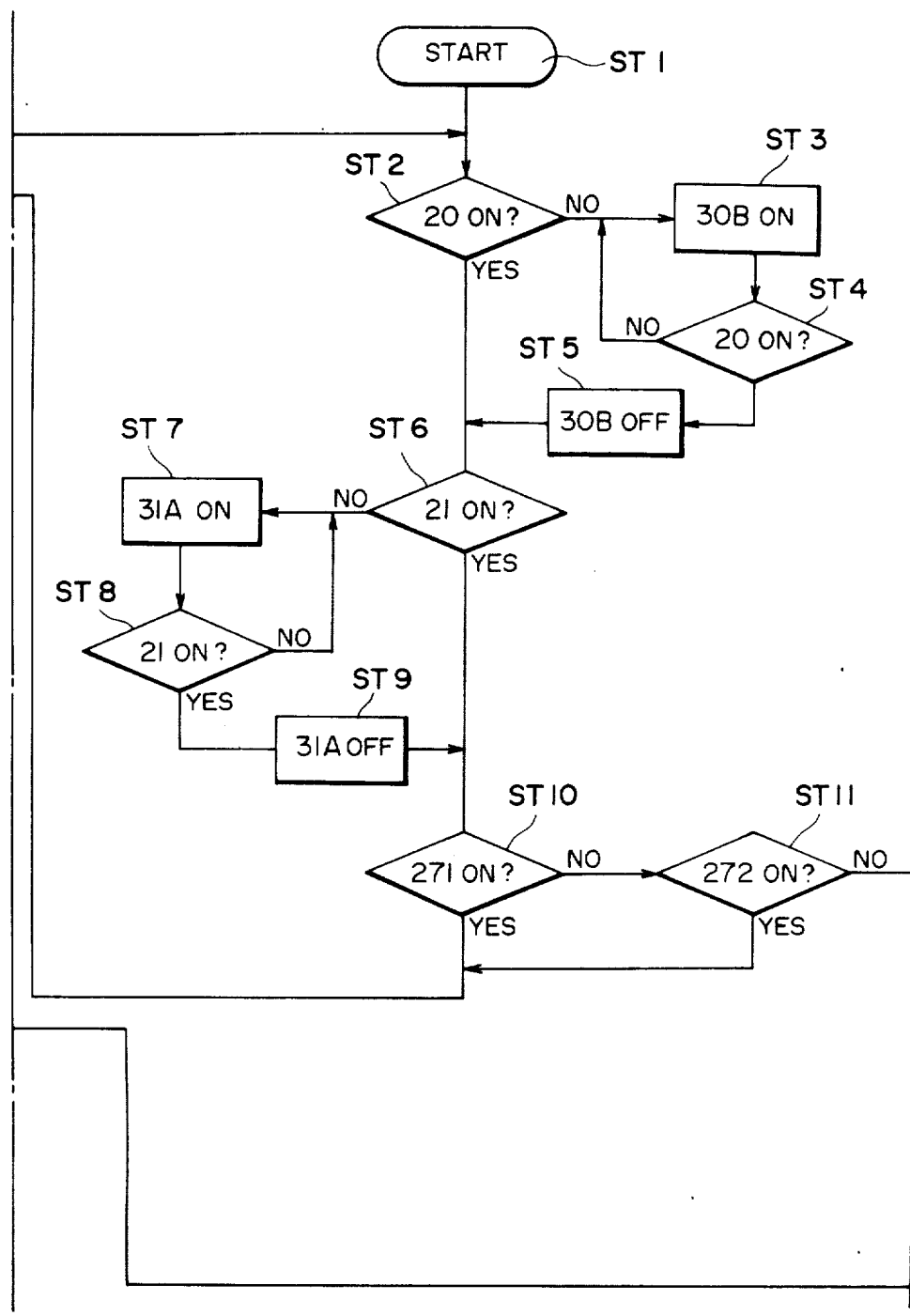

FIG. 6 is a flow chart illustrating the control operation of the unit 26. The apparatus is energized by a switch at step (ST) 1. At step 2, the discrimination is made as to whether the reading head 3 is at the home position HP5 or not. If not, the motor 8 is driven to bring the reading head 3 to the home position HP5 through the steps 3, 4 and 5. Then, at step 6, the discrimination is made as to whether or not the recording head 103 is at the home position HP6. If not, the motor 108 is driven to bring the recording head 103 to the home position HP6 through the steps 7, 8 and 9.

Then, the discrimination is made as to whether the enlarging copy key 271 is selected or whether one to one copy key 272 is actuated at steps 10 and 11. If either one of them is actuated, the sequence goes to step 12 where the discrimination is made as to whether or not the sub-scan support 10a is at the home position HP1. If not, the motor 17 is driven to bring the sub-scan support 10a to the home position HP1 through the steps 13, 14 and 15. Subsequently, at step 16, the discrimination is made to whether or not the sub-scan support 110a is at the home position 2. If not, the motor 117 is driven to bring the sub-scan support 110a to the home position HP2 through the steps 17, 18 and 19.

On the other hand, if the reducing copy key 273 is actuated, the discrimination is made as to whether or not the sub-scan support 110a is at the home position HP4 at step 20. If not, the motor 117 is driven to bring the sub-scan support 110a to the home position HP4 through the steps 21, 22 and 23. Then, at step 24, the discrimination is made as to whether or not the sub-scan support 10a is at the home position HP3. If not, the motor 17 is driven to bring it to the home position HP3 through steps 25, 26 and 27. Then, at step 28, it is discriminated whether or not the copy start key 274 is actuated. If so, the copying operation is carried out in the manner described above.

Although the one-to-one copy is included in the enlarging copy in the foregoing description, it may be included in the reducing copy. Or, the heads 3 and 103 may be moved in either direction without any problem.

In order to change the copy magnification, the lens for imaging on the image sensor of the reading head 3 is constituted as a zoom lens or the like which can change the magnification in response to the selected magnification. Or, it is a possible alternative that the electric signals produced by the image sensor is processed in a known manner for changing the magnification. When the image is to be enlarged, for example, a proper number of adjacent ink jet elements are driven in response to one electric signal produced by one photoelectric transducer element of the image sensor. When the reduced copy is to be formed, one ink jet element is driven in response to only one of the plural electric signals produced by a proper number of adjacent image sensors. Since this technique is known, more detailed explanation is omitted for the sake of simplicity.

The present invention is applicable to the case where the original and the recording paper in place of the heads are moved in the sub-scan direction. In this case, the main-scan guide rails for the reading head 3 and the recording head 103 may be common in the manner similar to the case of the sub-scan direction movement described in the foregoing.

In the foregoing description, the original reading operation by the reading head 3 is effected only during its movement in the direction of A, but it is a possible alternative that the original reading operation is also effected during the opposite direction movement B after termination of the main-scan in the direction A. In the latter case, the recording head 103 performs its recording operation during its movement in the direction A.

In the foregoing, the recording head 103 has been described as being an ink jet type head, but it may be a thermal transfer type head or the like.

In this invention, the sub-scan supports for the head, the main-scan guide rails for the same head, the driving source comprising the main-scan motor and the rotational shaft and the drive transmission means comprising the pulleys and the wire, may be constructed as a unit. This is applicable to the reading head and/or the recording head. This unit structure is applicable not only to the device of the present invention, but it is also applicable to the other apparatus.

In the foregoing embodiments, the copying apparatus is of such a type that the copying operation can be performed at an enlarged and/or reduced magnification as well as the unit magnification. However, the present invention is applicable to the apparatus capable of the unit magnification only, the apparatus capable of the unit magnification and the enlarging magnification only or the apparatus capable of the unit magnification and the enlarging magnification only.

As described above, according to the present invention, the co-planar arrangement makes it possible that the height of the apparatus is reduced. Also, the enlarging or reducing magnification operation as well as the unit magnification operation, may be performed without mechanical interference between elements.

In another aspect of the present invention, since the driving mechanism for each of the heads is not upright but lies or its side, the height and therefore the size of the apparatus can be reduced with the additional result that it is released from the influence of vibration. In a further aspect of the present invention, since the reading head and the recording head are guided by a common guiding means, the number of parts of the apparatus can be reduced so that the cost of the apparatus can be decreased.

While the invention has been described with reference to the structure disclosed herein, it is not confined to the details set forth and this application is intended to cover such modifications or changes as many come within the purposes of the improvements or the scope of the following claims.

What is claimed is:

1. A copying apparatus, comprising:
   an original support for supporting an original to be copied;
   a recording material support for supporting a recording material on which an image of the original on said original support is formed;
   a reading head, movable in a plane, for reading the original to produce electric signals;
   means for driving said reading head in a predetermined scanning direction;
   a recording head, movable in substantially the same plane as said reading head, for forming an image of the original on the recording material supported on said recording material support in accordance with the electric signals produced by said reading head;
   means for driving said recording head in the scanning direction; and
   means for controlling said reading head driving means and said recording head driving means to move said reading and recording heads at different speeds and to cause the faster moving head to precede the other head.

2. An apparatus according to claim 1, wherein said original support and said recording material support are opposed and parallel to each other.

3. An apparatus according to claim 1, wherein said apparatus is capable of effecting enlarging copying, and wherein said controlling means controls so that said recording head precedes said reading head during enlarging copying.

4. An apparatus according to claim 1, wherein said copying apparatus is capable of effecting reducing copying, and wherein said controlling means controls so that said reading head precedes said recording head during reducing copying.

5. An apparatus according to claim 1, further comprising common guiding means for guiding said reading head and said recording head.

6. An apparatus according to claim 1, wherein said reading head and said recording head are returned to predetermined positions after termination of a scanning operation.

7. An apparatus according to claim 5, further comprising means for moving said reading head and said recording head in a direction substantially perpendicular to said predetermined scanning direction, wherein said reading head and said recording head move oppositely.

8. An apparatus according to claim 7, further comprising driving sources for driving said reading head and said recording head in the perpendicular direction, each having a motor and rotational shaft, wherein a longitudinal direction of each of said driving sources is positioned substantially parallel to the predetermined scanning direction.

9. An apparatus according to claim 7, wherein said means for moving said reading head and said recording head in the perpendicular direction comprises separate auxiliary guiding means for guiding said reading head and said recording head, respectively, in the perpendicular direction.

10. An apparatus according to claim 9, wherein said separate auxiliary guide means each have a plurality of guide rails engaged with an associated head.

11. A copying apparatus, comprising:
an original support for supporting an original to be copies;
a recording material support for supporting a recording material on which an image of the original on said original support is formed;
a reading head, movable in a plane, for reading the original to produce electric signals;
means for driving said reading head in a predetermined scanning direction;
a recording head, movable in substantially the same plane as said reading head, for forming an image of the original on the recording material supported on said recording material support in accordance with the electric signals produced by said reading head, selectively in an enlarged or reduced scale;
means for driving said recording head in the scanning direction; and
control means for switching the predetermined scanning direction depending on whether the selected magnification is an enlarging or reducing magnification.

12. An apparatus according to claim 11, wherein said original support and said recording material support are opposed and parallel to each other.

13. An apparatus according to claim 11, further comprising common guiding means for guiding said reading head and said recording head.

14. An apparatus according to claim 11, wherein said switching control means returns said reading head and said recording head to predetermined adjacent end positions after termination of a scanning operation, wherein the adjacent predetermined end positions for enlarging magnification are opposite to those for reducing magnification.

15. An apparatus according to claim 11, further comprising means for selecting magnification of a copying operation of said apparatus, said control means changing a scan starting position in accordance with the magnification selected.

16. An apparatus according to claim 11, wherein the scan start position for an enlarging magnification and that for a reducing magnification are different and are adjacent opposite end portions of said original support.

17. An apparatus according to claim 11, further comprising means for moving said reading head and said recording head in a direction substantially perpendicular to said predetermined scanning direction, wherein said reading head and said recording head move oppositely.

18. An apparatus according to claim 11, wherein said reading head and said recording head are moved at different speeds, and wherein the one of said head which moves at higher speed precedes the other.

19. A copying apparatus, comprising:
an original support for supporting an original to be copied;
a recording material support for supporting a recording material on which an image of the original on said original support is formed;
a movable reading head for reading the original to produce electric signals;
a movable recording head for forming an image of the original on the recording material supported on said recording material support in accordance with the electric signals produced by said reading head;
first supporting means for supporting said reading head;
second supporting means for supporting said recording head;
common guiding means for guiding said first and second supporting means in a predetermined scanning direction; and
driving means for driving said first and second supporting means along said common guiding means;
wherein said first supporting means includes reading head guiding means for guiding said reading head in a direction substantially perpendicular to the predetermined scanning direction and reading head driving means for driving said reading head along said reading head guiding means; and
wherein said second supporting means includes recording head guiding means for guiding said recording head in the perpendicular direction and recording head driving means for driving said recording head along the recording head guiding means.

20. An apparatus according to claim 19, wherein said apparatus is capable of effecting variable magnification copying, and further comprising control means for controlling said first support means and second supporting means to move at different speeds and cause the faster moving supporting means to precede the other in the predetermined scanning direction upon non-unit magnification.

21. An apparatus according to claim 20, further comprising means for selecting magnification of a copying operation of said apparatus, said control means changes a scan starting position in accordance with the magnification selected, wherein the scan start position upon an enlarging magnification and that upon a reducing magnification are different and adjacent opposite end portions of said original support.

22. An apparatus according to claim 21, wherein said reading head supported by said first supporting means and said recording head supported by said second supporting means are moved in opposite directions.

23. An apparatus according to claim 19, wherein said first supporting means, said reading head supporting means and said reading head driving means are constructed as a unit.

24. An apparatus according to claim 19, wherein said second supporting means, said recording head guiding means and said recording head driving means are constructed as a unit.

* * * * *

UNITED STATES PATENT AND TRADEMARK OFFICE
CERTIFICATE OF CORRECTION

PATENT NO. : 4,700,238

DATED : October 13, 1987

INVENTOR(S) : HIROSHI SUGIYAMA

It is certified that error appears in the above-identified patent and that said Letters Patent is hereby corrected as shown below:

COLUMN 1

Line 11, "form" should read --forms--.

COLUMN 3

Line 26, "pullely" should read --pulley--.

COLUMN 4

Line 2, "is" should read --are--.
    Line 53, "stepwisely." should read --stepwise.--.

COLUMN 6

Line 6, "photointerruptor" should read --photointerrupter--.
    Line 24, "photointerruptor" should read --photointerrupter--.
    Line 52, "30a and 31a," should read --30A and 31A,--.

COLUMN 7

Line 10, "made to" should read --made as to--.

COLUMN 8

Line 15, "enlarging" should read --reducing--.
    Line 24, "or" should read --on--.
    Line 35, "many" should read --may--.

UNITED STATES PATENT AND TRADEMARK OFFICE
CERTIFICATE OF CORRECTION

PATENT NO. : 4,700,238

DATED : October 13, 1987

INVENTOR(S) : HIROSHI SUGIYAMA

It is certified that error appears in the above-identified patent and that said Letters Patent is hereby corrected as shown below:

COLUMN 9

Line 37, "copies;" should read --copied;--.

COLUMN 10

Line 20, "head" should read --heads--.
Line 58, "support" should read --supporting--.

Signed and Sealed this

Fifth Day of July, 1988

*Attest:*

DONALD J. QUIGG

*Attesting Officer*     *Commissioner of Patents and Trademarks*